United States Patent
Moskvitin

(10) Patent No.: US 7,474,800 B2
(45) Date of Patent: Jan. 6, 2009

(54) METHOD AND APPARATUS FOR REMOVING IMAGE COMPRESSION ARTIFACTS

(75) Inventor: Konstantin E. Moskvitin, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 659 days.

(21) Appl. No.: 10/767,807

(22) Filed: Jan. 29, 2004

(65) Prior Publication Data

US 2005/0169538 A1    Aug. 4, 2005

(51) Int. Cl.
*G06K 9/40* (2006.01)
*G06K 9/38* (2006.01)

(52) U.S. Cl. ............... 382/275; 382/261; 382/268; 382/271

(58) Field of Classification Search ........... 382/254, 382/260–261, 264–275
See application file for complete search history.

(56) References Cited

U.S. PATENT DOCUMENTS

| | | | |
|---|---|---|---|
| 4,509,195 A * | 4/1985 | Nadler | 382/237 |
| 4,573,070 A | 2/1986 | Cooper | |
| 5,424,780 A | 6/1995 | Cooper | |
| 5,850,294 A | 12/1998 | Apostopoulos et al. | |
| 5,852,475 A | 12/1998 | Gupta et al. | |
| 6,195,467 B1 * | 2/2001 | Asimopoulos et al. | 382/261 |
| 6,529,637 B1 | 3/2003 | Cooper | |
| 6,665,447 B1 * | 12/2003 | Chan | 382/254 |
| 6,870,964 B1 | 3/2005 | Cooper | |
| 7,031,551 B2 * | 4/2006 | Yano et al. | 382/275 |
| 2003/0156301 A1 * | 8/2003 | Kempf et al. | 358/486 |

OTHER PUBLICATIONS

B. Ramamurthi, A. Gersho, Nonlinear Space-Variant Post Processing of Block Coded Images, IEEE Transactions on Acoustics, Speech & Signal Processing, vol. ASSP-34, Oct. 1986, pp. 1258-1268.

A. Zakhor, Iterative Procedure for Reduction of Blocking Effects in Transform Image Coding, IEEE Transaction on Circuits & Systems for Video Technology, vol. 2, #1, Mar. 1992, pp. 91-95.

\* cited by examiner

*Primary Examiner*—Brian Q Le
*Assistant Examiner*—Nathan Bloom
(74) *Attorney, Agent, or Firm*—Vedder Price P.C.

(57) ABSTRACT

A method and apparatus from removing image compression artifacts includes comparing a center pixel value with a perimeter pixel value to generate a compare pixel value. The compare pixel value is compared with a threshold value such that when the compare pixel value is below a threshold value, a count value is incremented and an accumulation value is accumulated. The method and apparatus includes repeating the comparison of perimeter pixel values with the center pixel values. The method and apparatus further includes if the count value has been incremented, generating an output center pixel value based on the quotient of the accumulation value divided by the count value as the center pixel value.

23 Claims, 4 Drawing Sheets

METHOD AND APPARATUS FOR REMOVING IMAGE COMPRESSION ARTIFACTS

FIELD OF THE INVENTION

The present invention relates generally to image rendering and more specifically to the removal of compression artifacts in a rendered image.

BACKGROUND OF THE INVENTION

With the growth of high-speed data transfer, there has also been a correlating growth in image compression techniques for the compression of video images so they may be transferred at a higher rate of speed. For example, a well-recognized example of one available image compression technique is the Motion Pictures Experts Group ("MPEG") compression techniques, such as MPEG-1, MPEG-2 and MPEG-4.

While an image is compressed using any of the image compression techniques, when an image is decompressed, there are unwanted artifacts that may arise. For example, in some decoding techniques, an artifact known as a blocking effect or mosquito noise may occur. Mosquito noise compression artifacts may also be commonly referred to as "DeRinging". In the blocking effect, these artifacts may be frame independent and cause the loss of data through the compression of various blocks. When a block is decompressed, a line or other visual artifact may be disposed between pixels.

Another unwanted artifact may be unclear text or other lettering effects. In one example, the repeating of a letter or noise around the letter may be a decompression artifact or it may provide pixels of varying colors.

There currently exists techniques using algorithms to perform deblocking. Although, current implementations are not cost-effective due to requiring upwards of eight or more passes to do the deblocking. Moreover, the current deblocking algorithms are also linear, therefore, they must do a line-by-line computation. This deblocking algorithm is very inefficient and extremely costly in hardware computation, processing speed and is not a feasible implementation with a standard computing system.

Another artifact reduction technique is to determine if a line must be modified by examining specific pixels. If the pixels must be modified, the process includes rotating the picture by 180° and performing processing steps on a second line. Once again, this algorithm is expensive to perform as it contains many steps and cannot be performed in a real-life processing scenario. Typically, this algorithm requires approximately 33 milliseconds per frame to do all of the computations and in a standard computing system, the maximum computation must be performed at a rate of at least 10 milliseconds per frame. Although, the above technique may be performed for small amounts of data, it is not applicable to large amounts of data, such as a continuous stream or a compressed video file.

Another prior art approach, such as disclosed by U.S. Pat. No. 5,850,294, discloses a filtering on true non-edge pixels within blocks containing edge pixels rather than smoothing the edge pixels. This technique seeks to avoid eventual blur and picture sharpness loss due to true edge filtering. This technique utilizes discrete cosine transform domain detection rather than edge detection in the pixel processing pipeline. Therefore, the system does not process true edge pixels but rather passes the pixels unprocessed in order to retain sharpness.

As such, there exists a need for a post-processing filter operation capable of performing the reduction or elimination of image compression artifacts in a decompressed video input, wherein the processing can take place in a real-time processing operation and includes filtering for all pixels within an image.

BRIEF DESCRIPTION OF THE DRAWINGS

The invention will be more readily understood with reference to the following drawings, wherein.

DETAILED DESCRIPTION OF A PREFERRED EMBODIMENT

Generally, a method and apparatus for removing image compression artifacts includes a comparator operably coupled to receive a threshold of value. The comparator may be an implemented in a hardwired device or a processor processing executable instructions, wherein the threshold value may be an image intensity value or any other suitable value for comparison and subsequent removal of image compression artifacts as recognized by one having ordinary skill in the art. The method and apparatus further includes an accumulator and a counter, wherein the accumulator and the counter are operably coupled to the comparator such that the accumulator may receive an accumulation value from the comparator and the counter may receive a counter value from the comparator. The accumulator and counter may be any type of electronic device or devices implemented in hardware, software or a combination thereof, capable of storing and incrementing stored values.

The method and apparatus further includes the comparator capable of receiving a center pixel value and a perimeter pixel value. The comparator generates a compare pixel value which is the difference between the perimeter pixel value and the center pixel value. Further within the method and apparatus, the comparator compares the compare pixel value with a threshold value such that when the compare pixel value is below the threshold value, the comparator increments the count value and increments the accumulation value. In one embodiment, the count value may be incremented by a standard incrementing value and the accumulator may be incremented by compare pixel value.

Figure 1:
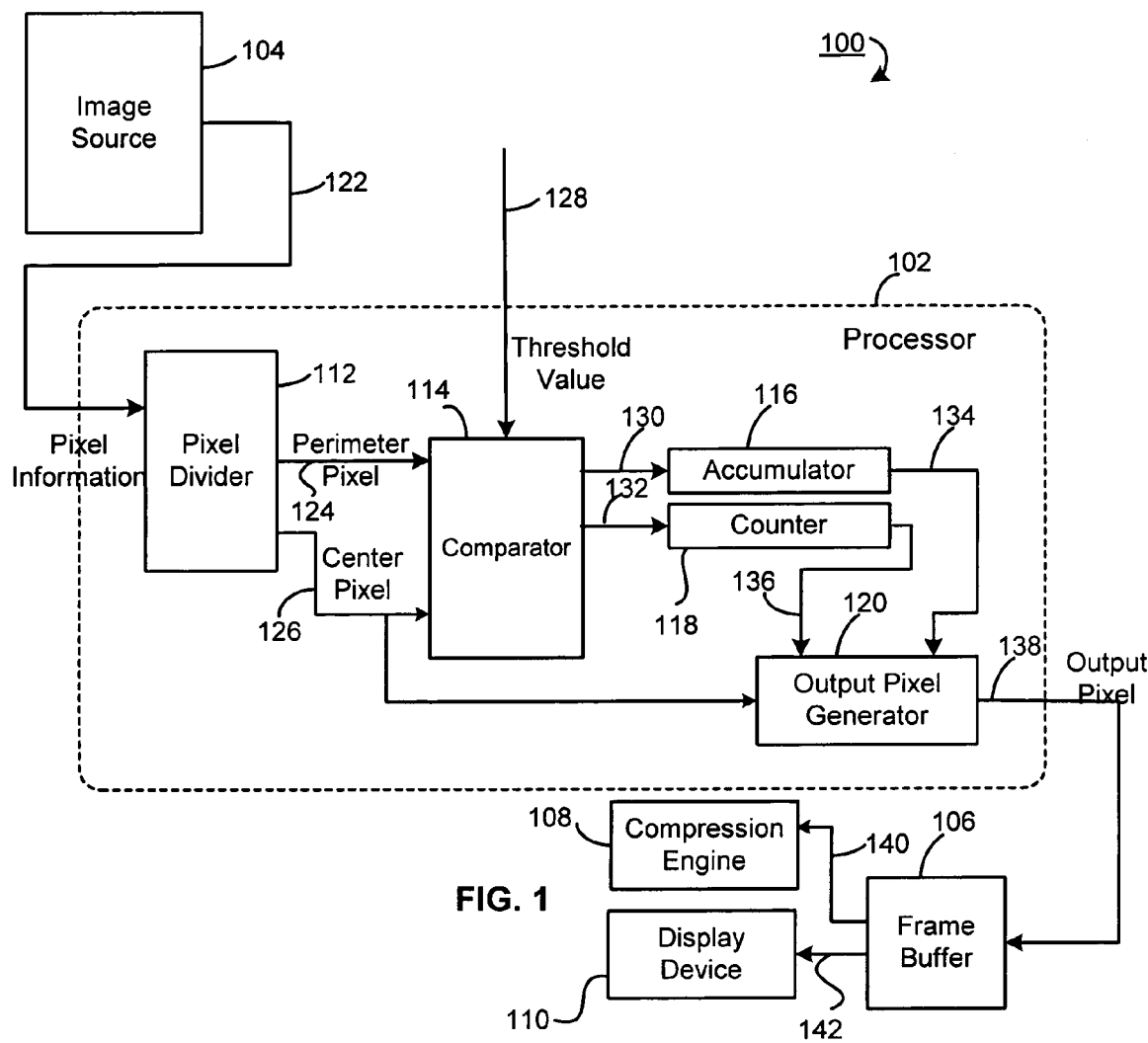
FIG. 1 is a block diagram of an apparatus for removing compression image artifacts.

More specifically, FIG. 1 illustrates an apparatus for removing image compression artifacts 100 in accordance with one embodiment of the present invention. The apparatus 100 includes a processor 102, an image source 104, a frame buffer 106, a compression engine 108 and a display device 110. The processor 102 may be, but not limited to, a single processor, a plurality of processors, a DSP, a microprocessor, an ASIC, a state machine or any other implementation capable of processing and executing software. The term processor should not be construed to refer exclusively to hardware capable of executing software, and may implicitly include DSP hardware, ROM for storing software, RAM and any other volatile or non-volatile storage medium. Moreover, the processor 102 may be operable coupled to a memory device not specifically shown wherein the memory device may provide executable instructions such that the processor 102 may perform operations in response to those executable instructions wherein, the memory may be, but not limited to, a single memory, a plurality of memory locations, shared memory, CD, DVD, ROM, RAM, EEPROM, optical storage, microcode, or any other non-volatile storage medium capable of storing data for use by the processor 102.

In one embodiment, the processor 102 includes a pixel divider 112, a comparator 114, an accumulator 116, a counter 118 and an output pixel generator 120. The processor 102 is coupled to the image source 104 such that pixel information 122 may be provided to the pixel divider 112. The pixel divider 112 may thereupon generate a perimeter pixel 124 and a center pixel 126 from the pixel information 122.

Figure 2:
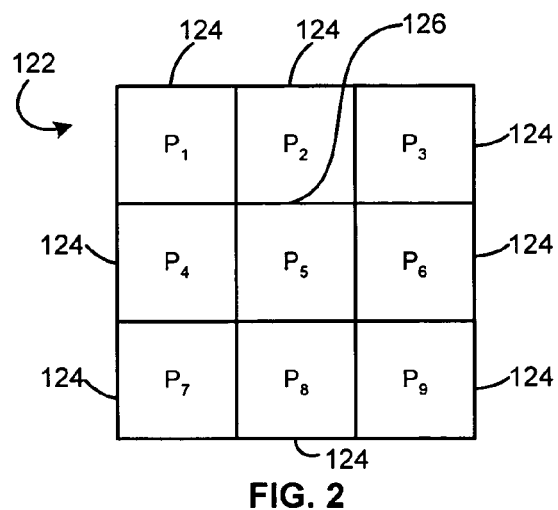
FIG. 2 is a graphical representation of an image frame having a plurality of pixels.

More specifically, FIG. 2 illustrates a graphical representation of a block of pixel information 122 having a plurality of pixels, labeled therein as $P_1$-$P_9$, in a 3×3 matrix array. In one embodiment, the perimeter pixel 124 may be any pixels of $P_1$, $P_2$, $P_3$, $P_4$, $P_6$, $P_7$, $P_8$ or $P_9$. Moreover, the center pixel 126 may be perimeter $P_5$.

Figure 3:
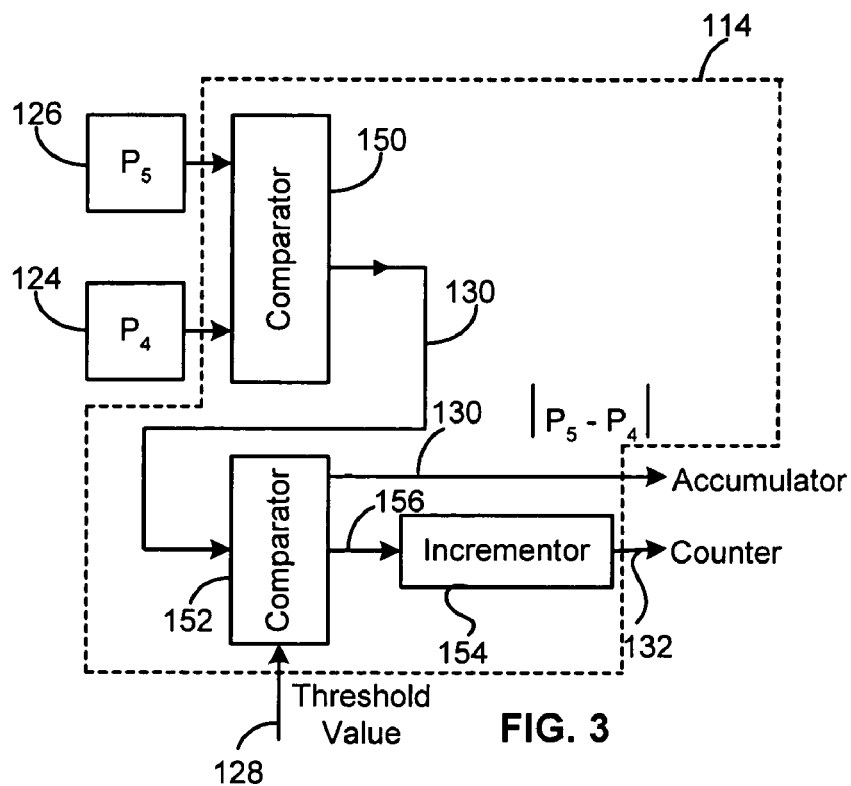
FIG. 3 is a block diagram of one embodiment of a comparator.

Referring back to FIG. 1, the comparator 114 receives a threshold value 128, the perimeter pixel 124 and center pixel 126. The comparator 114, as discussed below in more detail with regards to FIG. 3, compares the value of the perimeter pixel 124 with the value of the center pixel 126 and determines if the absolute value of the difference between the center pixel 126 and perimeter pixel 124 is greater than or less than the threshold value 128.

In the event a compare pixel value, which is the absolute value of the difference between the center pixel 126 and the perimeter pixel 124 is less than the threshold value 128, this indicates that center pixel 126 and perimeter pixel 124 are similar and in the same area. The comparator 112 provides the compare pixel value 130 to the accumulator 116 and a counter value 132 to the counter 118.

The accumulator 116 accumulates, or in one embodiment, may continually add or update the newly received compare pixel value 130 with a previously-stored value within the accumulator 116. Furthermore, the counter 118, increments a counter value 132, such as in one embodiment, for exemplary purposes only, may increment an original counter value from zero and incremented by a step of one for every determination where the compare pixel value 130 is less than the threshold value. Therefore, the accumulator 116 keeps an accumulation value of the compare pixel values and the counter 118 compares a count value indicating the number of times that the accumulation value within the accumulator 116 has been increased.

In accordance with one embodiment of the present invention, when all of the perimeter pixels 124 of the pixel information 122 have been compared with the threshold value 128, the accumulator provides the accumulation value 134 to the output pixel generator and the counter 118 provides the count value 136 to the output pixel generator 120. Furthermore, the output pixel generator 120 receives the center pixel 126 from the pixel divider 112. As discussed in further detail below with regards to FIG. 4, the output pixel generator 120 thereupon generates the output pixel value 138 which is provided to the frame buffer 106. The output pixel generator 120 determines whether or not the output pixel value 138 is the center pixel value 126 or a calculated value based on the accumulator value 134 and the counter value 136. In the event that the counter value 136 indicates a compare pixel value being less than the threshold value 128, the output pixel generator generates the output pixel value 138 as the accumulator value 134 divided by the counter value 136. This output pixel value 138 then represents a weighted generated output pixel value to cure a compression artifact through being within a variant threshold, such as the threshold value 128, relative to any neighboring pixel values, such as the value of pixel ($P_5$) 126 relative to any perimeter pixel values ($P_1$-$P_4$ or $P_6$-$P_9$) 124, as illustrated in FIG. 2.

In accordance with one embodiment of the present invention, when the output pixel generator 120 determines, based on the counter value 136, that none of the compare pixel values were less than the threshold value 128, the output pixel generator generates the output pixel value 138 as the center pixel value 126.

In the apparatus 100, the frame buffer 106 may be coupled to the compression engine 108 or the display device 110. As recognized by one having ordinary skill in the art, the frame buffer 106 may be simultaneously connected to both or either one of the two devices 108 and/or 110. The frame buffer 106 receives the output pixel values 138 and stores the value therein until a complete frame has been generated. A compressed frame 140 is provided to the compression engine 108 such that the frame 140 may be compressed. In another embodiment, an image frame 142 may be provided to the display device, such as a monitor, or any other suitable display devices as recognized by one having ordinary skill in the art, for being displayed thereon. Thereupon, the apparatus 100 receives an image source 104 having pixel information 122, wherein the image source 104 was originally compressed in a compressed format and the apparatus 100 removes the compression artifacts through a weighted accumulation value relative to a counter value with respect to a defined per-pixel threshold value.

In accordance with one embodiment to the present invention, the processing occurring within the processor 102 may be performed on many levels to perform parallel processing of an image. The number of pixels that may be processed at any one time may be dependent upon the processing pipeline. Furthermore, the apparatus 100 continues the per-pixel processing operations for all of the pixels in an image, such that through the repeated processing of multiple pixels in a parallel processing pipeline, full compression artifacts may be removed. It is further noted, that in one embodiment, based on the type of pixel information 122, the pixel information may be specific to a particular element of the pixel information. For example, in an RGB, the processing of the processor 102 may be applicable to the R value, the G value and the B value. Furthermore, in a YUV, it may be applicable to Y, U and V or only to the Y space. It is recognized by one having ordinary skill in the art, the processor 102 may be applied to any viewable image format capable of being compressed and decompressed.

FIG. 3 illustrates one exemplary embodiment of the comparator 114 in accordance with one embodiment of the present invention. The comparator 114 includes a first comparator 150, a second comparator 152 and an incrementor 154. The first comparator 150, the second comparator 152 and the incrementor 154 may be implemented in hardware, software or a combination thereof for performing the below-noted functions. The first comparator 150 receives the perimeter pixel 124 and the center pixel 126, as noted as $P_4$ and $P_5$, with respect to the matrix illustrated in FIG. 2. The first comparator 150 generates the compare pixel value 130 which is the absolute value of the different between the perimeter pixel 126 and the center pixel 124.

The compare pixel value 130 is provided to the second comparator 152 which compares the compare pixel value 130 with the threshold value 128. As discussed above, if the threshold value 128 is greater than the compare pixel value 130, the second comparator outputs an accumulator value of the compare pixel value and an increment value 156 to the incrementor 154. Wherein, the incremented 154 then provides the incremented counter value 132 to the counter 118 of FIG. 1. Although, in the event that the second comparator 152 determines that the compare pixel value 130 is greater than the threshold value 128, in one embodiment, the second comparator outputs an accumulator value of zero and an incrementor value also zero. Whereas, in one embodiment, the second comparator 152 may not generate an accumulator value and generate the output value 156 as zero to the incrementor 154 such that the counter is thereupon not incremented.

Figure 4:
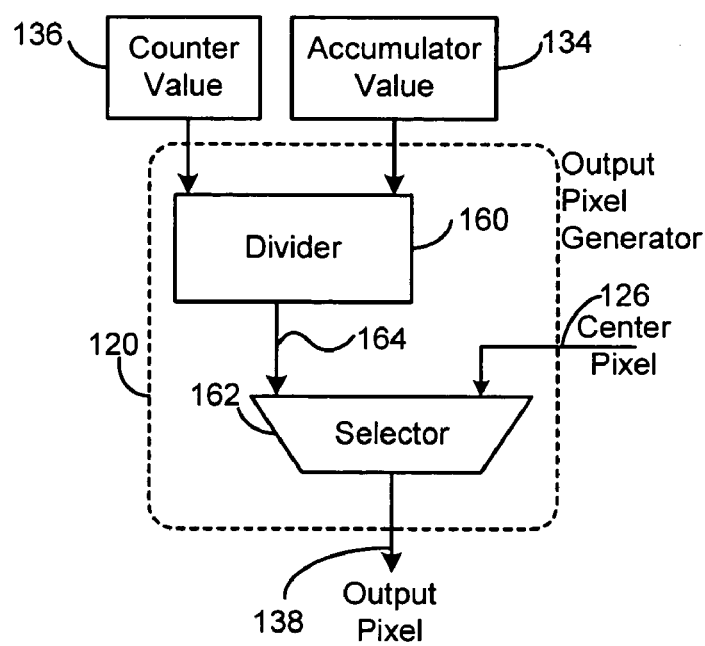
FIG. 4 is a block diagram of one embodiment of an output pixel generator.

FIG. 4 illustrates one exemplary embodiment of the output pixel generator 120 of FIG. 1, in accordance with one embodiment of the present invention. The output pixel generator 120 includes a divider 160 and a selector 162. The divider 160 receives the counter value 136 and the accumulator 134. In the event that the counter value 136 indicates that it has been incremented, such as in one embodiment may be greater than zero, the divider 160 generates a new output pixel value 164 as the accumulator value 134 divided by the counter value 136.

The selector 162 within the output pixel generator 120 receives the center pixel value 126 and the generated output pixel value 164. If the generated output pixel value, in one embodiment of the present invention, is greater than zero, thereby indicating that the counter value 136 is greater than zero, the selector provides the output pixel value as the generated pixel value 164. Although, in the event that the selector 162 receives a null value from the divider 160, thereby indicating that no accumulator value was accumulated and no counter value was incremented, further thereon indicating that the compare pixel value, such as pixel value 130 of FIG. 3, was never less than the threshold value 128, thereupon the selector 162 provides the output pixel value as the original center pixel value 126.

The present invention may also be described in algorithmic format, wherein the algorithm provides as follows:

The algorithm is performed on a matrix of pixels defined as [2+(2*m+1)] by [2+(2*n+1)], where m=0, 1, ... M and n=0, 1, ... N.

$$R\_out = \frac{1}{R\_count} \sum_{(i,j=s)} \sum R(i, j)$$

The value S equals a set of pixels satisfying the condition:

$|R(i\_cent, j\_cent) - R(i,j)| < T$

R_count equals the number of pixels in the set of pixels S.
i and j are indices of pixel positions within the block of pixels.
R(i,j) is the input pixel.
R_out is the output pixel.
T is a threshold value.

In one embodiment, the algorithm includes the step of comparing the absolute difference between pixels R(i,j)–R(i_cent, Rj_cent) with the threshold value. If the difference is below the threshold, then accumulate the value and increment a counter. The above steps are repeated for all of the pixels within the block and a final step includes dividing the accumulated value by the value of counter to get the output pixel value.

Figure 5:
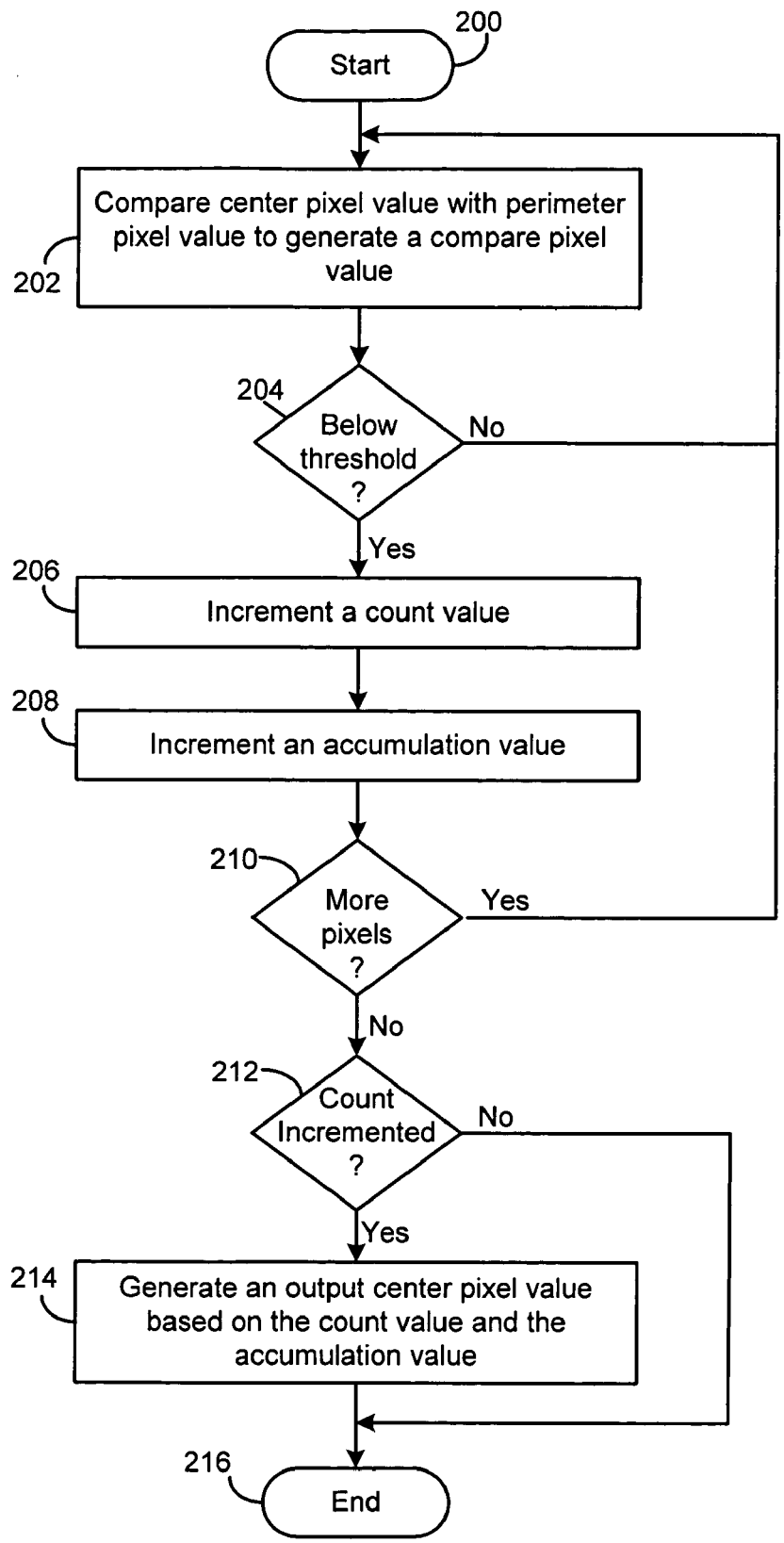
FIG. 5 is a flowchart illustrating the steps for removing compression image artifacts in accordance with one embodiment of the present invention.

FIG. 5 illustrates a flowchart representing the steps of a method for removing image compression artifacts in accordance with one embodiment of the present invention. The method begins, step 200, by comparing center pixel value with a perimeter pixel value to generate a compare pixel value, step 202. Step 204, a determination is made if the compare pixel value is below a threshold pixel value. In one embodiment, this is performed by the comparator 114 of FIG. 1. If the compare pixel value is not below a threshold value, the method reverts back up to step 202 where the center pixel value is compared with another pixel value. In the event that the determination is that the compare pixel value is below a threshold value, the next step, 206, is incrementing account value and incrementing an accumulation value, 208. As discussed above, in one embodiment the count value may be incremented by one incremented level and the accumulation value may be incremented by the value of the compare pixel value.

The method further includes another determination, step 210, if there are more pixels within a pixel array to be compared. If there are more pixels, the method once again reverts back to step 202 where a center pixel is again compared with another perimeter pixel to generate the compare value. In the event there are no more pixels, more specifically no more perimeter pixels to be compared with a center pixel value, the method proceeds to step 212 where a determination is made whether the count value has been incremented. If the count value has been increment, thereby indicating that there has been at least one occurrence where the compare pixel value was below a threshold value, the next step, step 214, is the generation of an output center pixel value based on the count value and the accumulation value. Thereupon, the method is complete, step 216. Moreover, in the event that the termination step 212 indicates that the count value has not been indicated, the method also concludes, step 216.

Figure 6:
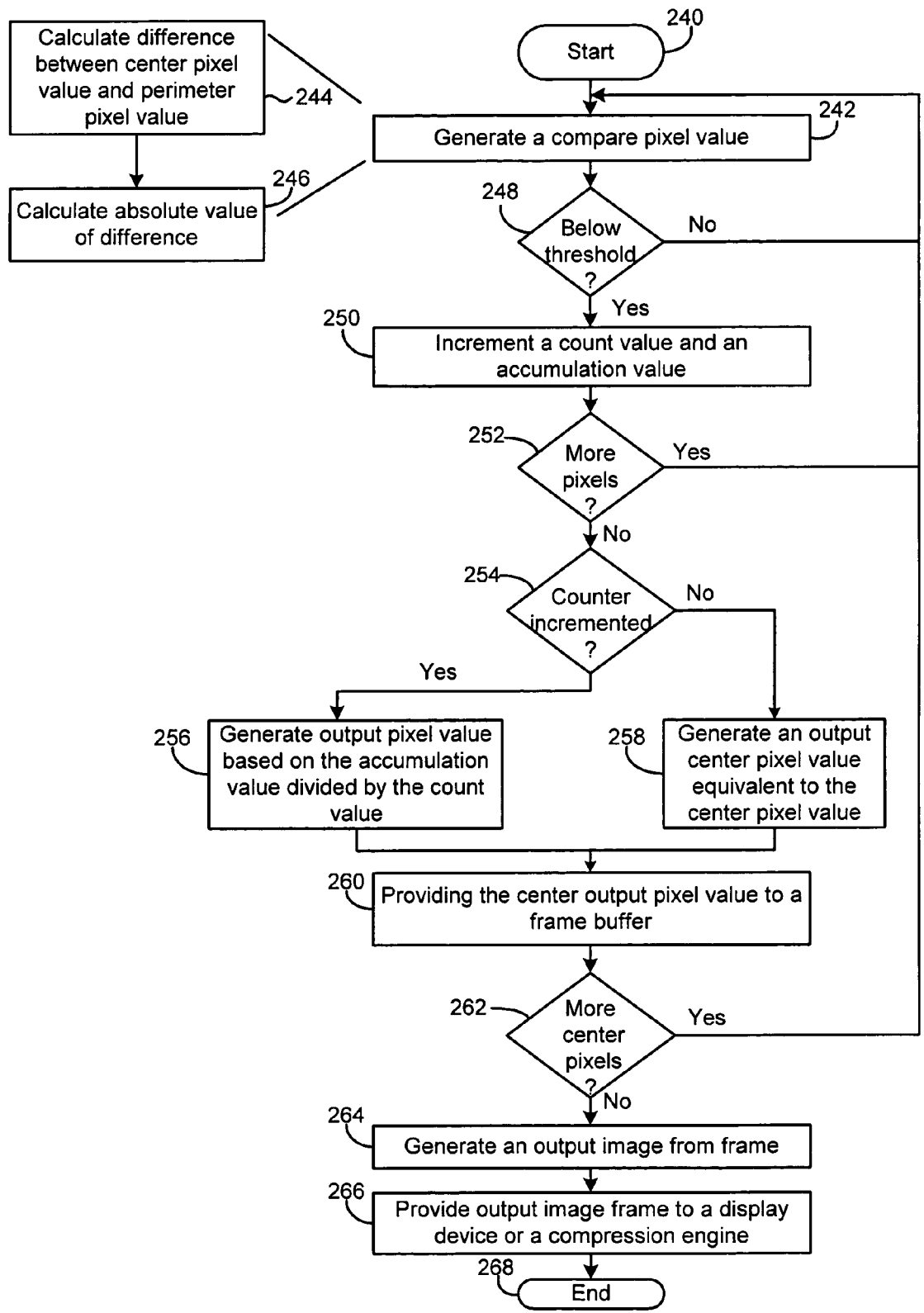
FIG. 6 is a flowchart of another embodiment of a method for removing compression image artifacts.

FIG. 6 illustrates another flowchart representing another embodiment of the method for removing image compression artifacts, in accordance with one embodiment of the present invention. The method begins, step 240, by generating a compare pixel value, step 242. In one embodiment, the compare pixel value is generated as the difference between a center pixel value and a perimeter pixel value, step 244, and calculating the absolute value of the difference, step 246. The method proceeds to step 248 where the determination is made if the compare pixel value is below a threshold value. If the determination is no, the method reverts back to step 242 where another compare pixel value is generated. In the event the determination of step 248 is yes, the next step, step 250, is to increment a count value and an accumulation value.

The method proceeds to decision step 252 where a determination is made if there are more pixels to be examined. If the determination is yes, the method reverts back to step 242 to generate another compare pixel value and if the determination is no, the method proceeds to step 254 where another determination is made whether the counter has been incremented. If the counter has been incremented, the next step, step 256 is to generate an output pixel value based on accumulation value divided by the count value. Whereas, if a determination of step 254 is that the counter has not been incremented, the next step, step 258 is the generation of an output center pixel value equivalent to the center pixel value.

The next step proceeding either steps 256 or 258 is providing the center output pixel value to a frame buffer, step 262. Thereupon, a determination is made if more center pixels are to be compared with perimeter pixels, step 262. In the event this determination is in the positive, the method reverts back to step 242 where another compare pixel value is generated as the difference between the absolute value of the difference between the center pixel value of the perimeter pixel value. In the event the determination of step 262 is no, the next step is generating an output image from the frame composed of the various pixel values, step 264, wherein in one embodiment this may be disposed within the frame buffer, such as frame buffer 106 of FIG. 1. The method thereupon proceeds to step 266 including providing the output image frame to a display device or a compression engine, such as the display device 110 of the compression engine 108 of FIG. 1. Thereupon, the method is complete, step 268.

It should be understood that the implementation of other variations and modifications of the invention in its various aspects will be apparent to those of ordinary skill in the art, and that the invention is not limited by the specific embodiments described herein for example, the generation of the compare pixel value may be generated by any suitable calculation such that it may be compared with a threshold value to determine if there exists the potential or actual presence of an image compression artifact. It is therefore contemplated to cover by the present invention, any and all modifications, variation, or equivalents that fall within the spirit and scope of the basic underlying principle disclosed and claimed herein.

What is claimed is:

1. A method for removing image compression artifacts comprising:
   (a) comparing a center pixel value with a perimeter pixel value to generate a compare pixel value;
   (b) when the compare pixel value is below a threshold value;
      (b1) incrementing a count value; and
      (b2) incrementing an accumulation value;
   (c) repeating (a) through (b) for each of a plurality of perimeter pixel values; and
   (d) generating an output center pixel value, wherein:
      (d)(1) if the count value has been incremented in (b), the output center pixel value is based on the count value and the accumulation value without using the center pixel value; and
      (d)(2) if the count value has not been incremented in (b), the output center pixel value is equivalent to the center pixel value.

2. The method of claim 1 wherein (a) further comprises:
   (a1) calculating the difference between the center pixel value and the perimeter value; and
   (a2) calculating the absolute value of the difference of (a1).

3. The method of claim 1 wherein (d1) further comprises generating the output center pixel value as the accumulation value divided by the count value.

4. The method of claim 1 wherein the threshold value defines an edge.

5. The method of claim 1 wherein (a) through (d) are performed once per color in a color scheme.

6. The method of claim 1 further comprising (e) providing the output center pixel value to a frame buffer.

7. The method of claim 6 further comprising:
   (f) repeating (a) through (e) for each of the plurality of pixels of an image except for a plurality of image perimeter pixels; and
   (g) generating an output image frame including the image perimeter pixels and the plurality of output center pixel values.

8. The method of claim 7 further comprising h) providing the output image frame to a display device.

9. The method of claim 7 further comprising (h) providing the output image frame to a compression engine.

10. An apparatus for removing image compression artifacts comprising:
    a comparator operably coupled to receive a threshold value;
    an accumulator and a counter, the accumulator and the counter operably coupled to the comparator such that the accumulator is operative to receive an accumulation value and the counter is operative to receive a counter value, wherein the comparator is operative to receive a center pixel value and a perimeter pixel value such that the comparator is operative to generate a compare pixel value as the difference between the perimeter pixel value and the center pixel value and operative to compare the compare pixel value with the threshold value such that when the compare pixel value is below the threshold value, the comparator is operative to increment the count value and increment the accumulation value; and
    an output pixel generator operatively coupled to the accumulator and the counter wherein the output pixel generator is operative to generate an output center pixel value, wherein if the counter value has not been incremented, the output center pixel value is the center pixel value and if the counter value has been incremented, the output center pixel value is the accumulation value divided by the count value.

11. The apparatus of claim 10 further comprising a pixel divider operably coupled to the comparator and the output pixel generator, wherein the pixel divider is operative to provide the center pixel value to the comparator and the output pixel generator, and the pixel divider is further operative to provide the perimeter pixel to the comparator.

12. The apparatus of claim 11, wherein the pixel divider is further operative to receive pixel information from an image source.

13. The apparatus of claim 10 further comprising a frame buffer operably coupled to the output pixel generator, wherein the frame buffer is operative to receive the output center pixel and store the output center pixel therein.

14. The apparatus of claim 13 wherein the frame buffer is operably coupled to a compression engine such that an image frame may be provided to the compression engine.

15. The apparatus of claim 13 wherein the frame buffer is operably coupled to a display device such that an image frame may be provided to the display device.

16. An apparatus for removing image compression artifacts comprising:
    a memory device storing a plurality of executable instructions; and
    a processor operably coupled to the memory device such that the processor, in response to the executable instructions:
    (a) compares a center pixel value with a perimeter pixel value to generate a compare pixel value;
    (b) when the compare pixel value is below a threshold value:
       (b1) increments a count value; and
       (b2) increments an accumulation value;
    (c) repeats (a) through (b) for each of a plurality of perimeter pixel values; and
    (d) generates an output center pixel value, wherein:
       (d)(1) if the count value has been incremented in (b), the output center pixel value is based on the count value and the accumulation value without using the center pixel value; and
       (d)(2) if the count value has not been incremented in (b), the output center pixel value is equivalent to the center pixel value.

17. The apparatus of claim 16, the processor further in response to executable instructions:
(a1) calculates the difference between the center pixel value and the perimeter value; and
(a2) calculates the absolute value of the difference of (a1).

18. The apparatus of claim 16 wherein the processor in response to the executable instructions, generates the output center pixel value as the accumulation value divided by the count value.

19. A method for removing image compression artifacts comprising:
(a) comparing a center pixel value with a perimeter pixel value to generate a compare pixel value;
(b) when the compare pixel value is below a threshold value:
(b1) incrementing a count value; and
(b2) incrementing an accumulation value;
(c) repeating (a) through (b) for each of a plurality of perimeter pixel values thereby creating a corresponding plurality of compare pixel values; and
(d) generating an output center pixel value, wherein:
(d)(1) if the count value has been incremented in (b), the output center pixel value is based on the compare pixel values that are below the threshold value without using the center pixel value; and
(d)(2) if the count value has not been incremented in (b), the output center pixel value is equivalent to the center pixel value.

20. The method of claim 1, wherein:
the center pixel value is associated with a center pixel and each of the plurality of perimeter pixel values is associated with respective perimeter pixel in a plurality of perimeter pixels,
each of the center pixel and the plurality of perimeter pixel values is associated with a color model having multiple components, and
each of the center pixel value and the plurality of pixels is associated with a single component of the color model.

21. The apparatus of claim 10, wherein:
the center pixel value is associated with a center pixel and each of the plurality of perimeter pixel values is associated with respective perimeter pixel in a plurality of perimeter pixels,
each of the center pixel and the plurality of perimeter pixel values is associated with a color model having multiple components, and
each of the center pixel value and the plurality of pixels is associated with a single component of the color model.

22. The apparatus of claim 16, wherein:
the center pixel value is associated with a center pixel and each of the plurality of perimeter pixel values is associated with respective perimeter pixel in a plurality of perimeter pixels,
each of the center pixel and the plurality of perimeter pixel values is associated with a color model having multiple components, and
each of the center pixel value and the plurality of pixels is associated with a single component of the color model.

23. The method of claim 19, wherein:
the center pixel value is associated with a center pixel and each of the plurality of perimeter pixel values is associated with respective perimeter pixel in a plurality of perimeter pixels,
each of the center pixel and the plurality of perimeter pixels is associated with a color model having multiple components, and
each of the center pixel value and the plurality of pixel values is associated with a single component of the color model.

* * * * *